United States Patent
Clem et al.

(10) Patent No.: US 7,675,908 B2
(45) Date of Patent: *Mar. 9, 2010

(54) PARALLEL CHANNEL ARCHITECTURE

(76) Inventors: Shaun Clem, 3259 Windmist Ave., Thousand Oaks, CA (US) 91362; Todd L. Khacherian, 3259 Windmist Ave., Thousand Oaks, CA (US) 91362; Darrin McGavin Patek, 3259 Windmist Ave., Thousand Oaks, CA (US) 91362; Jimmy Pu, 3259 Windmist Ave., Thousand Oaks, CA (US) 91362; Chris Reed, 3259 Windmist Ave., Thousand Oaks, CA (US) 91362; John Wallner, 3259 Windmist Ave., Thousand Oaks, CA (US) 91362

( * ) Notice: Subject to any disclaimer, the term of this patent is extended or adjusted under 35 U.S.C. 154(b) by 969 days.

This patent is subject to a terminal disclaimer.

(21) Appl. No.: 11/381,521

(22) Filed: May 3, 2006
(Under 37 CFR 1.47)

(65) Prior Publication Data
US 2006/0209812 A1 Sep. 21, 2006

Related U.S. Application Data

(63) Continuation of application No. 09/971,097, filed on Oct. 3, 2001, now Pat. No. 7,046,660.

(51) Int. Cl.
*H04L 12/50* (2006.01)
(52) U.S. Cl. .............. 370/357; 370/389; 370/400; 370/540; 370/543
(58) Field of Classification Search ................ 370/358, 370/366, 380, 391, 398, 540, 543
See application file for complete search history.

(56) References Cited

U.S. PATENT DOCUMENTS

| 4,383,316 A | 5/1983 | Seidel |
| 4,740,954 A | 4/1988 | Cotton |
| 4,754,451 A | 6/1988 | Eng |
| 5,278,689 A | 1/1994 | Gitlin et al. |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner*—Chi H. Pham
*Assistant Examiner*—Shick Hom
(74) *Attorney, Agent, or Firm*—Perkins Coie LLP

(57) ABSTRACT

A high data rate switch is disclosed. The switch may include fiber optic channels where a plurality of switching elements necessarily operate at a significantly lower data rate providing routing of variable or fixed size data packets from a plurality of source ports to a plurality of destination ports via a single serial link. This is may be provided by storing the high rate data temporarily in memory in each of the source ports and then downloading it at a lower rate in a complete data packet to a designated switching element, almost immediately distributing the next data packet that has been received by the source port to a next switching element. The switching element configuration provides automatic redundancy and a minimum amount of frame overhead while sustaining throughput at the high data rate.

45 Claims, 10 Drawing Sheets

U.S. PATENT DOCUMENTS

| | | | |
|---|---|---|---|
| 5,317,561 A | 5/1994 | Fischer et al. | |
| 5,404,461 A | 4/1995 | Olnowich | |
| 5,550,823 A | 8/1996 | Irie | |
| 5,555,543 A | 9/1996 | Grohoski | |
| 5,729,548 A | 3/1998 | Holender | |
| 5,856,977 A | 1/1999 | Yang et al. | |
| 5,961,626 A | 10/1999 | Harrison | |
| 6,026,092 A | 2/2000 | Abu-Amata et al. | |
| 6,067,408 A | 5/2000 | Runaldue | |
| 6,442,674 B1 | 8/2002 | Lee | |
| 6,487,171 B1 | 11/2002 | Honig | |
| 6,493,347 B2 | 12/2002 | Sindhu | |
| 6,570,876 B1 | 5/2003 | Aimoto | |
| 6,574,194 B1 | 6/2003 | Sun | |
| 6,597,696 B1 | 7/2003 | Toyama | |
| 6,611,527 B1 | 8/2003 | Moriwaki | |
| 6,697,359 B1 | 2/2004 | George | |
| 6,735,219 B1 | 5/2004 | Clauberg | |
| 6,754,741 B2 | 6/2004 | Alexander | |
| 6,795,870 B1 | 9/2004 | Bass | |
| 6,836,479 B1 | 12/2004 | Sakamoto | |
| 7,046,660 B2 * | 5/2006 | Wallner et al. | 370/386 |
| 2001/0037435 A1 | 11/2001 | Van Doren | |
| 2001/0053157 A1 | 12/2001 | Li | |
| 2002/0006128 A1 | 1/2002 | Yehuda et al. | |
| 2002/0061022 A1 | 5/2002 | Allen, Jr. | |
| 2003/0035427 A1 | 2/2003 | Alasti | |
| 2003/0118016 A1 * | 6/2003 | Kalkunte et al. | 370/389 |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm. Petaswitch Solutions, Inc., Company Overview, 2001, http://www.peta-switch.

Petaswitch Solutions, Inc., Company Overview, 2001, http://www.peta-switch.com/markets/overview.htm.

Fahmy, A Survey of ATM Switching Techniques, Aug. 14, 2001, Department of Computer and Information Science, The Ohio State University.

* cited by examiner

PARALLEL CHANNEL ARCHITECTURE

RELATED APPLICATION INFORMATION

This patent is a continuation of application Ser. No. 09/971,097 filed Oct. 3, 2001, now U.S. Pat. No. 7,046,660, issued May 16, 2006.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

INTRODUCTION

This patent is directed to switching apparatus for high speed channels using multiple parallel lower speed channels. Specifically, one application is in a switching network.

BACKGROUND OF THE INVENTION

In a switching network, all receiving channels (or ports) route data to a switching fabric, which then switches the data, which is normally in the form of data packets of uniform or variable length, to a specific destination transmit channel (or port). Because fiber optic technology can support data rates much higher than traditional electrical standards, fiber optic channels have become the high-speed channel standard. Because the data rate of a single channel of a switching network is now likely to be higher than the data rate of a single fabric connection, multiple fabric connections must be used to support the data rate of the single channel.

Thus the prior art implemented multiple connections in parallel to increase the effective bandwidth of a single fabric connection. FIG. 1 illustrates this concept which is known as packet striping (or bit splicing) where the input channel or sender node is divided into several lower speed channels and then resequenced again at the receiver node. Thus a typical data packet is divided into parts or stripes with each part being sent on a separate fabric connection. With the four connections, the effective bandwidth of the overall fabric connection is increased by a factor of four even though the actual bandwidth of each connection is one-fourth of that.

In packet striping, as implemented in a typical switching fabric, the packet is divided into equal chunks (a chunk being a portion of a packet) and each chunk is sent to a separate switching plane of the switching fabric.

In a practical example, a data packet which is 40 bytes in length sent over a fabric consisting of four parallel paths must be divided into four 10-byte chunks. Since each chunk or packet portion requires its own so-called header for identifying that chunk and its origin and destination, and this typically might require 2 bytes of information, this means that each transmitted data chunk has an overhead which is a substantial portion of the total data chunk. This effectively reduces the bandwidth by this amount (or, in other words, the effective data rate).

DETAILED DESCRIPTION OF PREFERRED EMBODIMENTS

Figure 2:
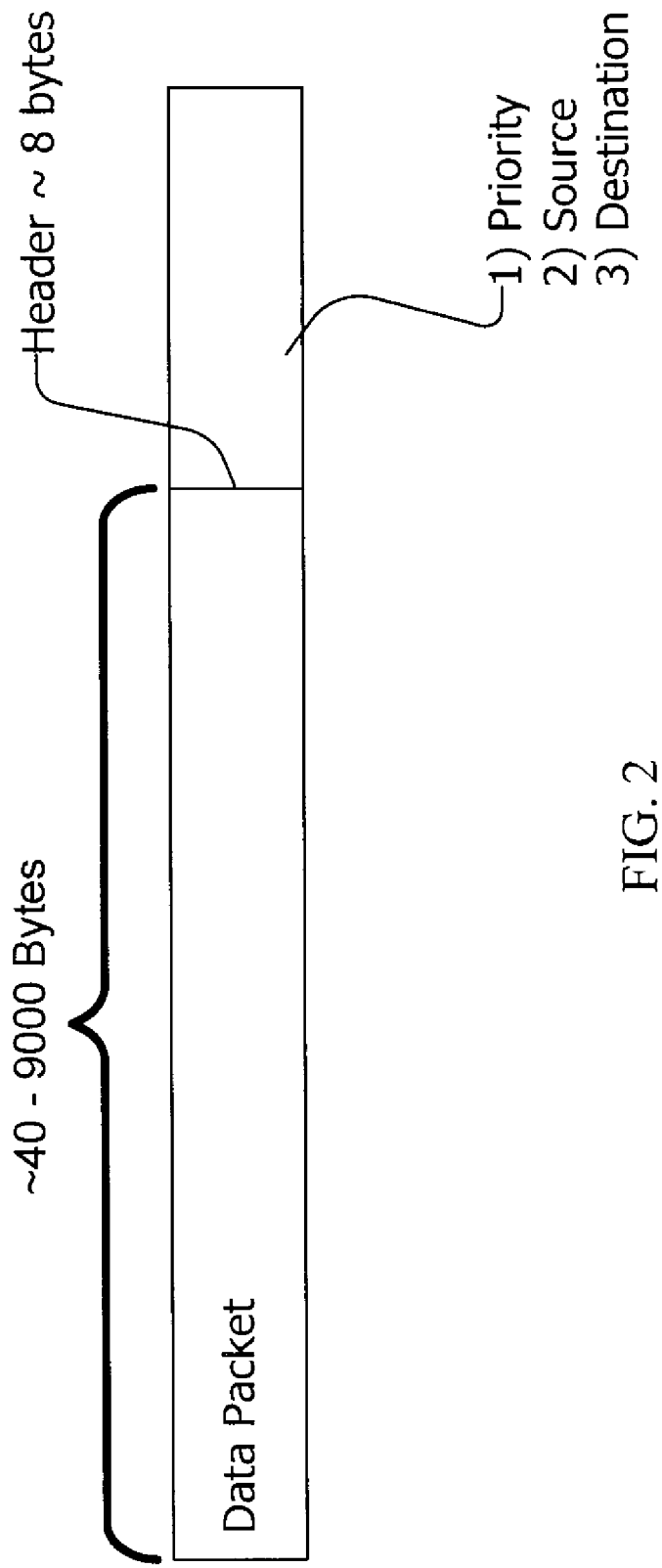
FIG. 2 is a representation of a data packet used in the present invention.

FIG. 2 illustrates a typical data packet configuration which the switching apparatus of the present invention operates on. This data packet itself may consist of 40 or fewer digital bytes or up to 9,000. Attached to the data packet in a manner well known in the art is, for example, an 8-byte so-called header which contains priority, source and destination information.

Figure 3:
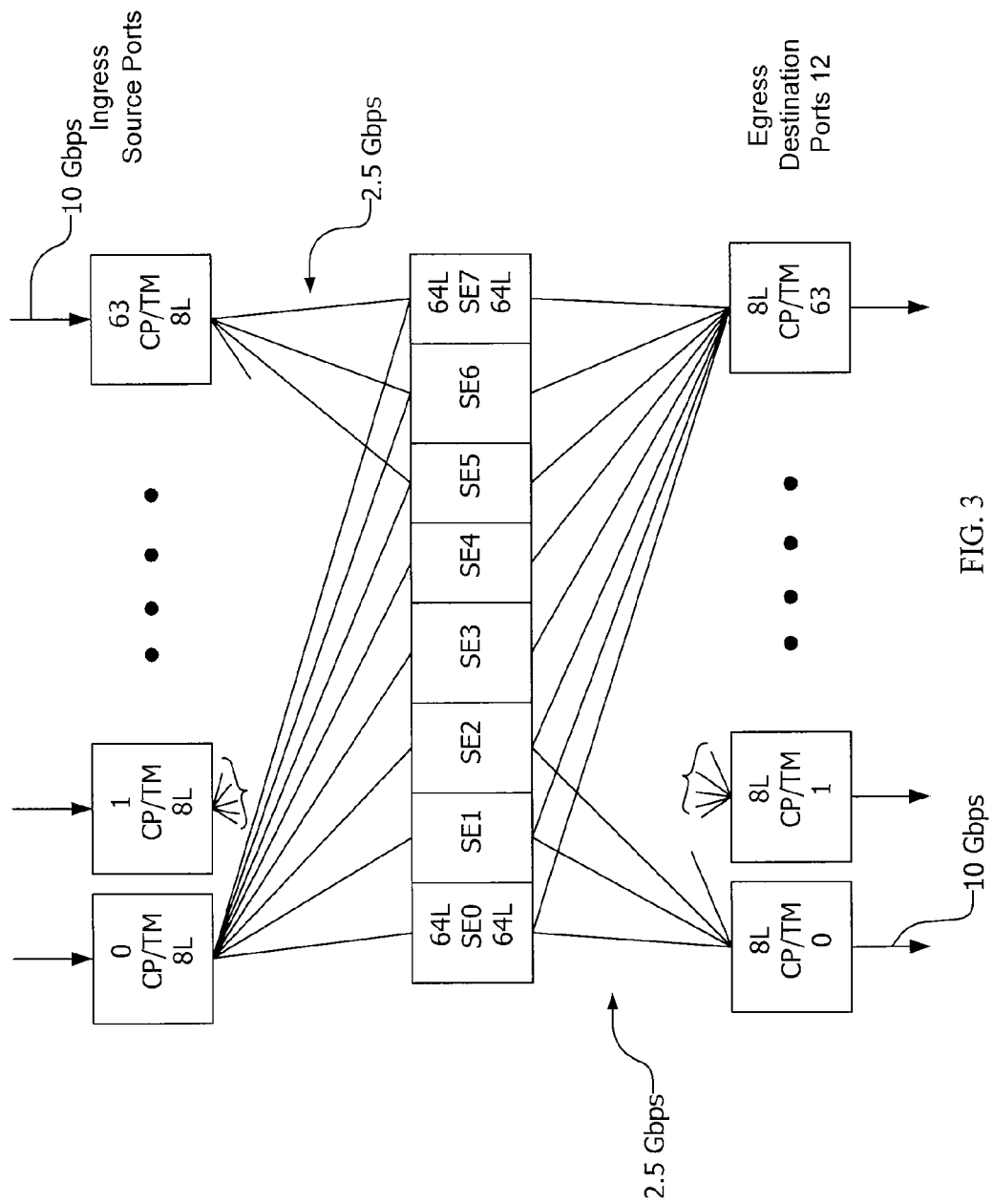
FIG. 3 is a simplified block diagram of switching apparatus incorporating the present invention.

FIG. 3 is an overall diagram of the switching apparatus where there are a number of source ports 10 numbered 0 through 63 each receiving from, for example a framer which normally puts together a digital data packet, at a rate of 10 Gbps. The source ports 10 include a TM (traffic manager) and a communications processor (CP) and are labeled CP/TM. Each source port has an 8-line output port, each individually coupled to an input port of switch elements SE0 through SE7 which together create a so-called switching fabric. In turn, the eight switching elements each with 64 input ports and 64 output ports are similarly connected on an output side to destination ports 12 also designated CP/TM which have 8-line inputs and are numbered 0 through 63. The combination of the 64 source ports and 64 destination ports make up a 64 port full duplex port.

Again, as on the input side, each output port of a switch element has a direct serial link to one of the CP/TMs or egress port units. Then the egress ports 12 are coupled into, for example, a high speed channel network (e.g., fiber optic) to transmit data at a 10 Gbps rate in a manner similar to the incoming data, but with the data having been rerouted to a selected destination port. Finally, as indicated in FIG. 3, the high input and output data rates of 10 Gbps cannot normally be sustained by the switch elements SE0 through SE7 which as indicated are limited to a lower data rate of 2.5 Gbps. Thus, in this practical embodiment the ratio of the higher data rate to the lower data rate is a 4:1 ratio.

Figure 4:
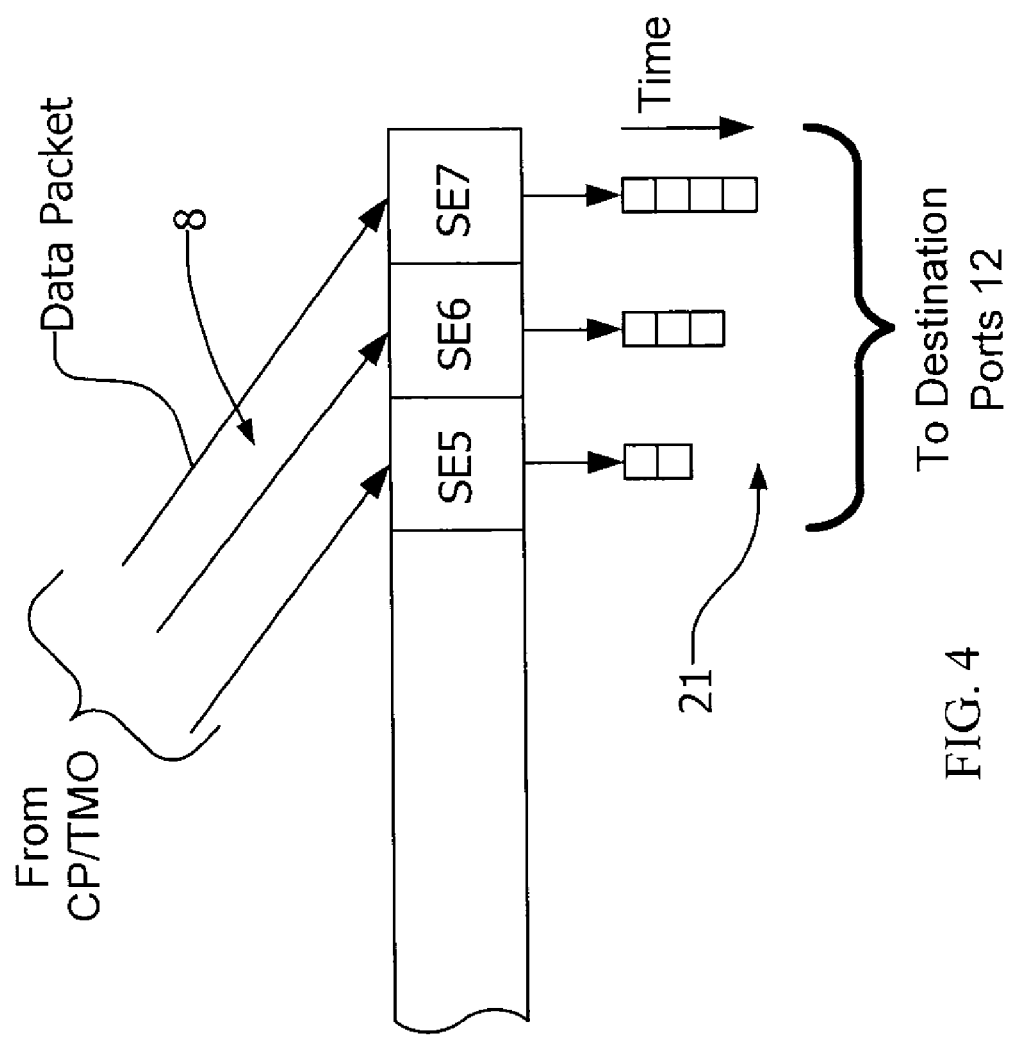
FIG. 4 is a detailed showing a portion of FIG. 3 illustrating its operation.

FIG. 4 illustrates in very brief form the operation of the present invention where the ingress port 10 designated CP/TM0 receives data at the high data rate of 10 Gbps and then via a plurality of output ports distributes this input data on the eight lines 18, one line to each $SE_0$ through $SE_7$, at a lower data rate of 2.5 Gbps. Thus on each of the lines 18 a data packet is sent, for example, as indicated to switching element $SE_7$, and routed to a predetermined destination port 12. Thereafter in a sequential successive or round robin manner the next link 18 is used to transmit another data packet to $SE_6$ and then to $SE_5$. As indicated at 21, these are blocks of data versus a time axis. Some latency is present but this is a minimal tradeoff to achieve a greater throughput. In other words, over a single switching fabric multiple parallel lower speed channels are provided but the effective throughput of data is at the higher data rate and with a complete data packet being transmitted through one serial link.

Figure 5:
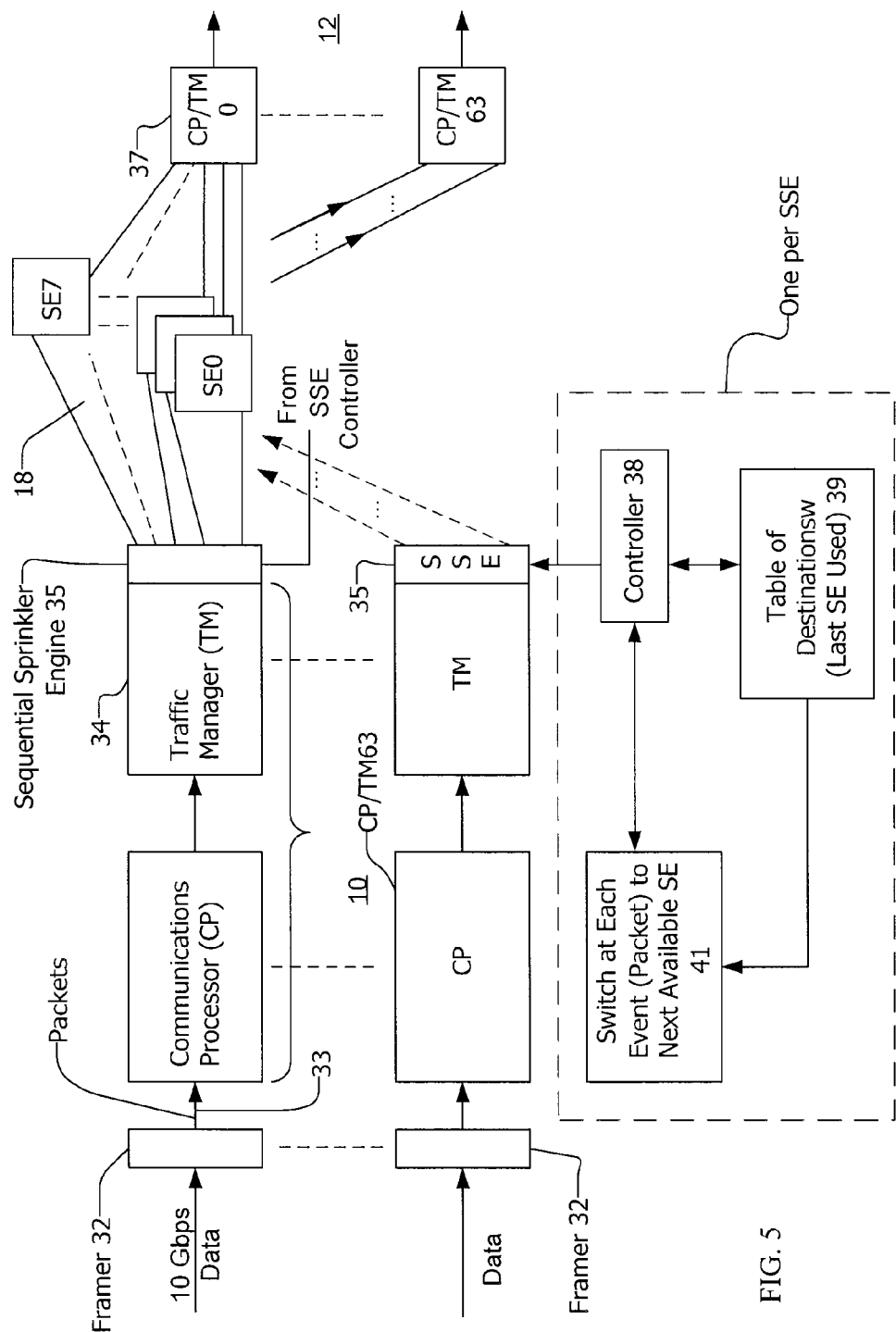
FIG. 5 is a block diagram of FIG. 3 in greater detail.

FIG. 5 shows the input port arrangement 10 in greater detail. Here each communications processor CP0 through CP 64 is input linked to a framer 32 which, as discussed above puts together frames or packets. On the line 33 these are transferred to the communications processors and then to the traffic managers (TM) 34. The general functions of such traffic managers are to formulate an additional header for data packets to provide parsing, classification and editing; the traffic manager also determines to which switching element SE the data packet is to be transferred and to which port of that switching element. This is done in conjunction with the sequential sprinkler engine 35 (SSE) which is a part of each traffic manager. The output of the traffic manager is actually the output port lines 18 (see FIG. 5) of the ingress port 10. There is one line to each switching element $SE_0$ through $SE_7$. The output side of the switching apparatus, as also indicated in FIG. 3, is a duplicate with CP/TM 0 through 63 forming destination ports 12.

Sequential sprinkler engines 35 of each ingress port function in conjunction with a controller 38 and its table of destinations 39 to successively switch data packets from one source output port to another on the lines 18.

Each SSE 35 has its own controller and associated units. In operation the table of destinations 39 includes the last SE which has been used; to which a data packet has been transferred. Then in combination with the SSE 35 and controller 38 and under the control indicated by the function block 41, a switch occurs successively from one SE to another at each event to the next available SE. And this event is when another data packet is received by the traffic manager. Thus, the SSE 35 in effect "sprinkles" or distributes on a sequential or successive basis data packets from one SE to another in a manner that the high speed data rate is maintained while at the same time not utilizing in effect a single serial link for each data packet and avoiding the split up data into smaller units where overhead becomes a problem.

Figure 6:
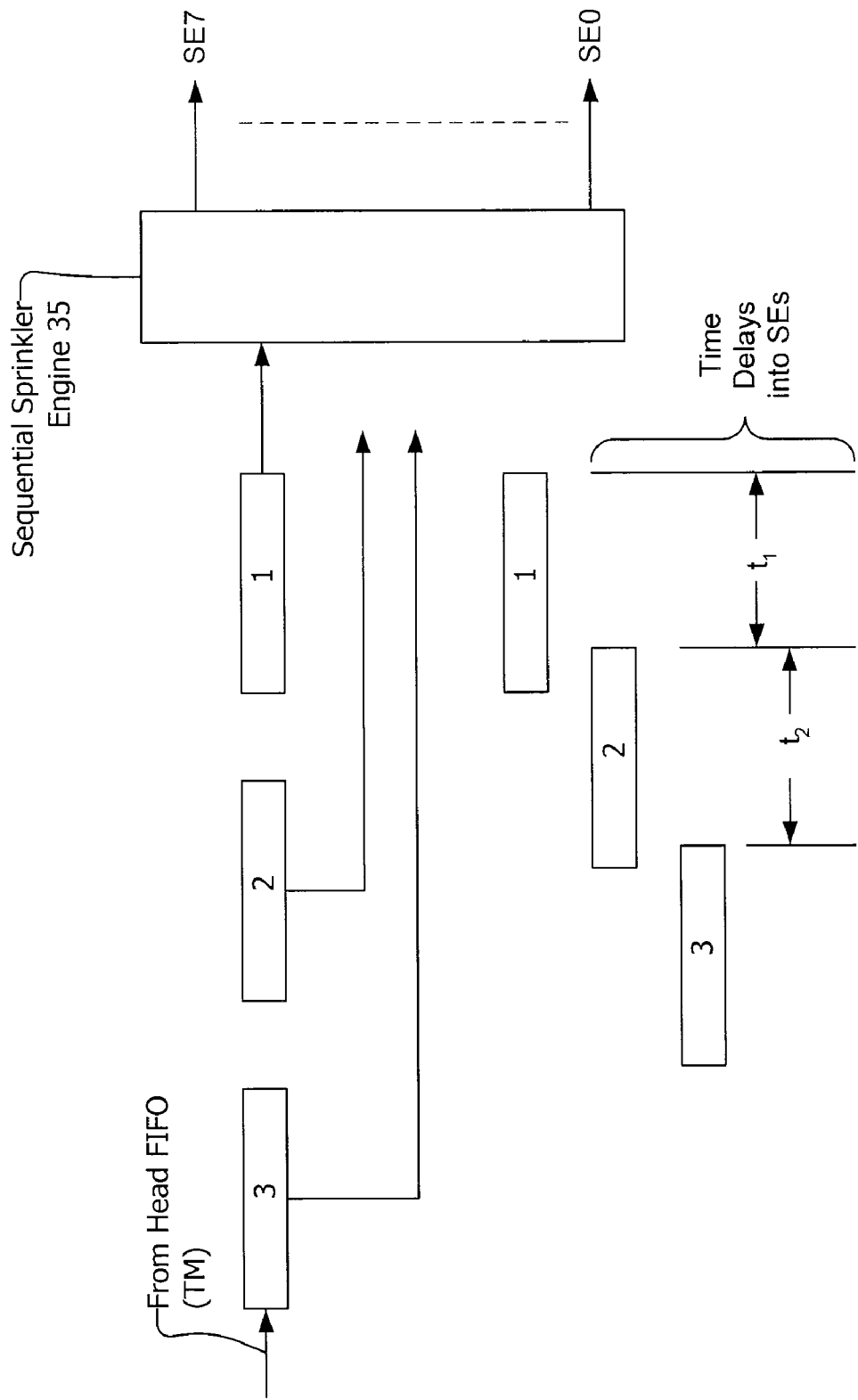
FIG. 6 is a diagram useful in understanding the operation of FIG. 5.

FIG. 6 illustrates in greater detail how the SSE 35 operates. Here from the traffic manager, indicated as being a FIFO (first in, first out memory), a line of data packets designated 1, 2 and 3 are being received. The first data packet is indicated as being sent to switching element 7. After this operation has started, a short time later, indicated as $t_1$, data packet 2 is transmitted (at the lower 2.5 Gbps rate) to $SE_6$. Then for data packet 3, at a later time $t_2$, its transmission to $SE_6$ is started. Due to the successive switching arrangement there is a latency but this is a minimal tradeoff to achieve greater throughput. As indicated by the logic unit 41 the availability of the SE may depend on whether it is being utilized at the moment for a previous data packet or has failed.

And, in fact, this illustrates the redundancy of the present invention where assuming an SE has failed, the logic assumes that this failed SE is busy and automatically goes to another switch element. For example, as illustrated in FIG. 3 with a 4:1 data input switch element data ratio, theoretically only four switch elements of the type illustrated are necessary. However, to provide for additional overhead due to headers, etc. additional bandwidth is provided by another two switch elements. In addition, to provide redundancy in case of failure of one of the SEs, two additional elements are provided. However, theoretically the number of switch elements may be exactly proportional to the ratio of data rates between the input data rate and the data rate capability of the switch elements. But throughput is still doubled even if only two switch elements are used. This may be feasible in some situations where there's not a constant high rate of data input.

Figure 7:
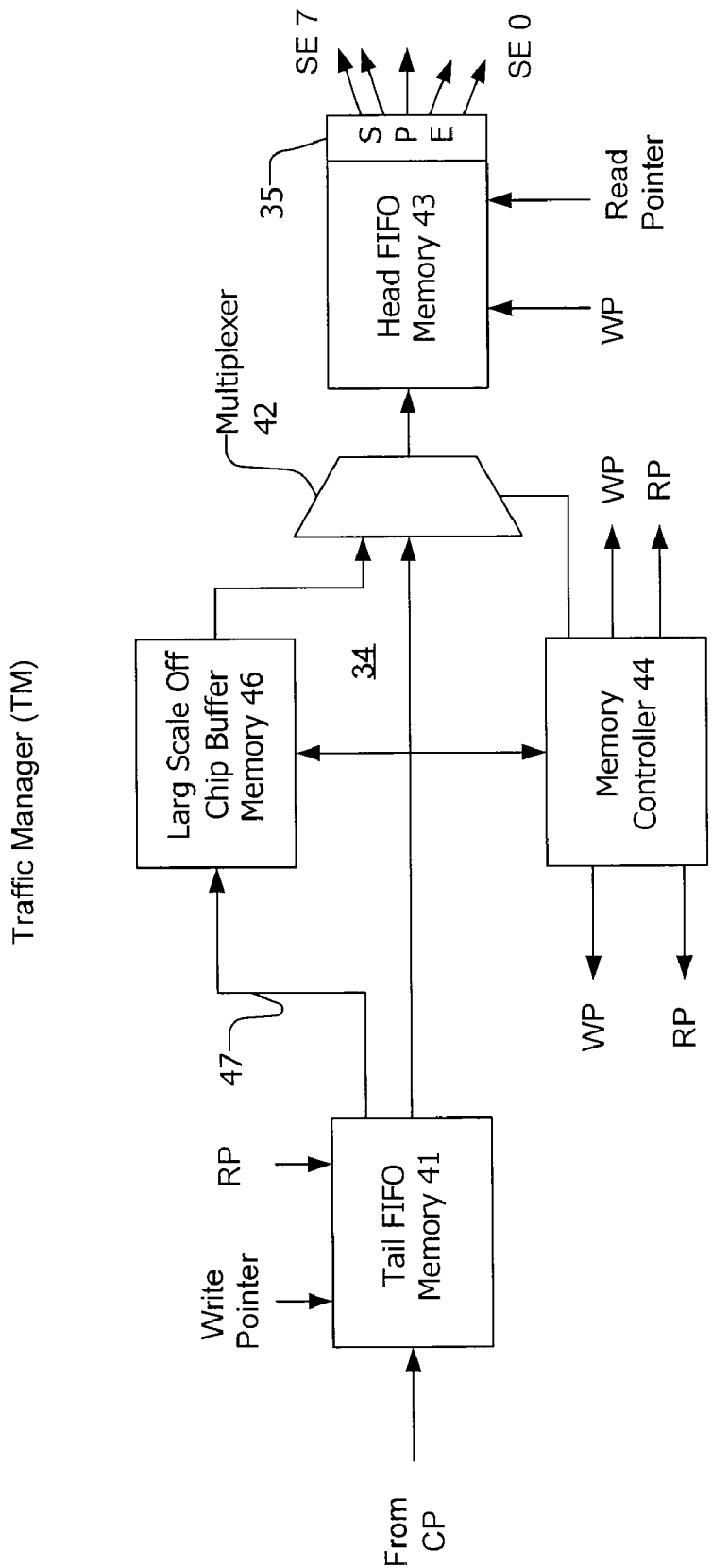
FIG. 7 is a more detailed block diagram of a portion of FIG. 5.

FIG. 7 illustrates in greater detail one possible configuration of a traffic manager 34. Because of the high rate of data input through the traffic manager from the communications processor (CP) and a slight time delay as illustrated in FIG. 6, some buffering must be included in the system. This is provided by a caching scheme. Such scheme is indicated in greater detail in a related application entitled "Head and Tail Caching Scheme", application Ser. No. 09/930,304. Referring in detail to FIG. 7, from the communications processor high speed data is coupled through the tail FIFO memory 41 and a multiplexer 42 to the head FIFO memory 43. Data packets will queue up as indicated in FIG. 6 as 1, 2 and 3 and be distributed by the sequential sprinkler engine (SSE) 35 and the read pointer (RP) to the various SEs as discussed. If data comes in at a rate faster than read or outputted to the switching elements fast, and the head FIFO memory 43 fills and the input data will start filling the tail FIFO memory 41. The write pointers and read pointers handle this detail under the control of memory controller 44 which has the WP and RP outputs. It is also coupled to the multiplexer 42. The tail or buffer FIFO 41 will initially keep the head FIFO memory 43 full as it is so-called de-queued (that is as it distributes data packets to the various switching elements). However, if the tail FIFO memory itself becomes full, then the so-called large scale off chip buffer memory 46 is utilized. Here as discussed in the above related application uniform blocks of data on line 47 are transferred into the memory 46. And the transfer is arranged to be very efficient by use of uniform data block sizes. Finally, when the sudden burst of data packets decreases the traffic manager can de-queue all data from the large scale memory 46 and return to its normal functioning.

Figure 8:
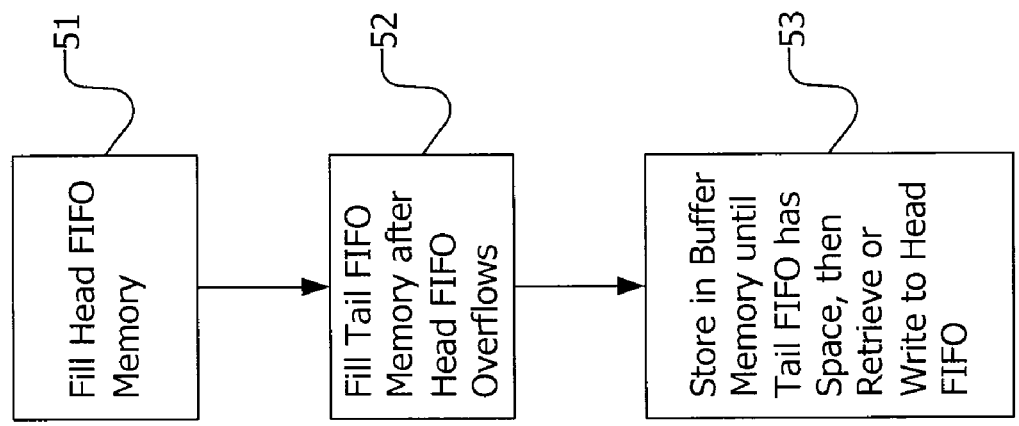
FIG. 8 is a flow chart useful in understanding the operation of FIG. 7.

The above process is illustrated in FIG. 8 where in step 51 the head FIFO memory is first filled and then in step 52 the tail FIFO memory after the head FIFO overflows. And finally in step 53 the data is stored in the buffer memory until the tail FIFO has space. Then the data is retrieved to the tail buffer and finally written to the head FIFO.

Figure 9:
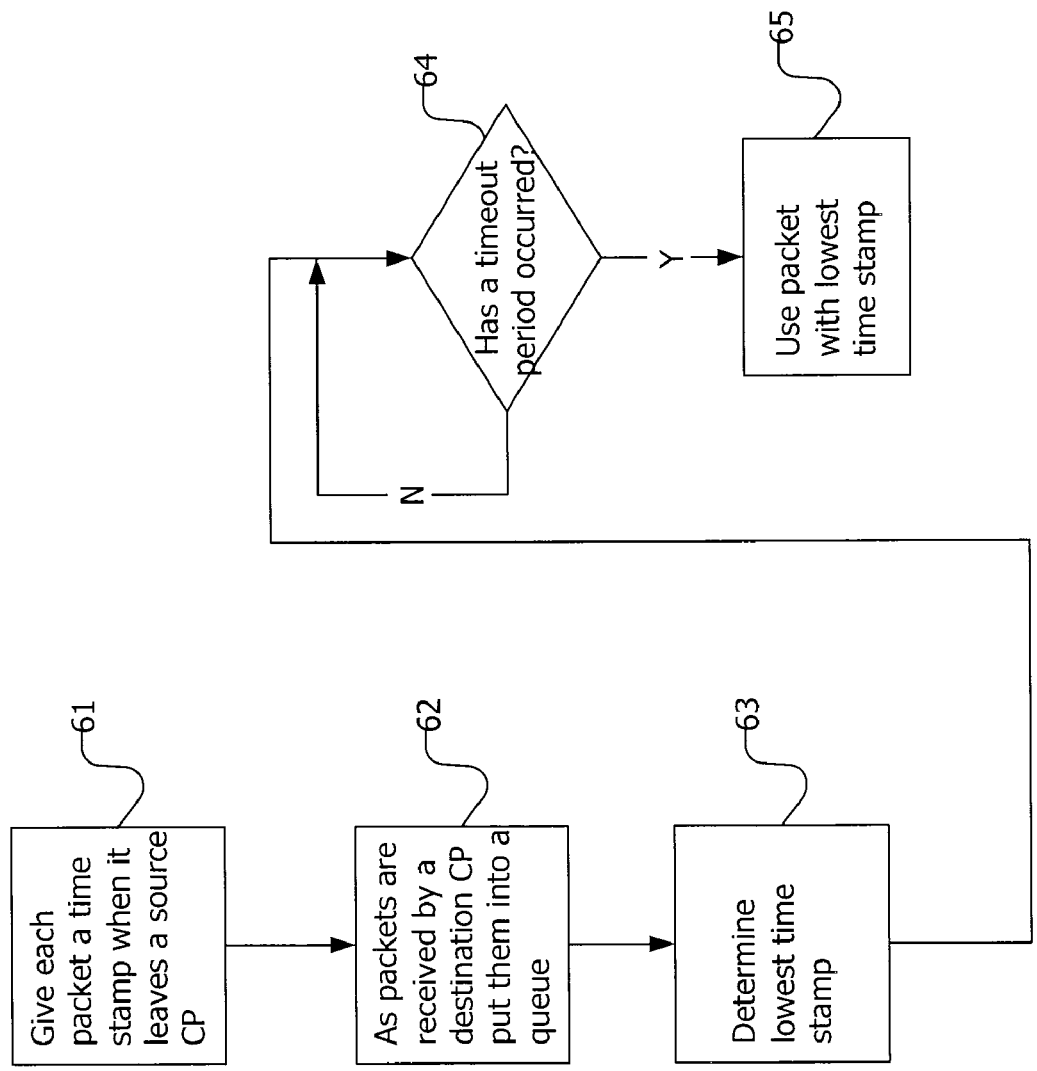
FIG. 9 is a flow chart useful in understanding the operation of the invention.

As illustrated in FIG. 4, because of the asynchronous nature of the data inputs to the switching elements and its output as indicated by the time axis reordering may be necessary of the data. In other words, the present invention trades some sacrifices some latency to maintain the highest data rate throughput and enable simple redundancy. Referring to FIG. 9, one reordering technique is illustrated in flow chart form. Here in step 51 each data packet gets a time stamp when it leaves a source communication processor. Then on the output side, when the packets are received by the destination communications processor, they are put into a queue. Each destination CP has a separate queue. As the packets are received, the lowest time stamp is determined at step 53. A time out period occurs when this system clock reaches the value of the lowest time stamp added to the minimum delay. If this time out period has not yet been released, the system repeats itself as illustrated in step 54. If it has occurred, as shown in step 55, it is now theoretically known that all frames have been received (assuming no other problems) and the packet with the lowest time stamp is placed at the head of the queue. This is just one illustration of reordering and others may be used. However, details of the reordering technique may be found in a related application titled "Reordering of Sequence Based Packets in a Switching Network", application Ser. No. 10/044,244.

To provide additional data ports, the switching fabric of the switching elements shown in FIG. 3 is easily scalable or expandable to accommodate greater data input. One technique is a butterfly expansion, illustrated in FIG. 10. Here there are the original SEs, SE0 and SE1 are so labeled. To expand additional switching elements designated SE2'-SE5' are connected with the designated interconnections that double the amount of input and output ports.

Figure 1:
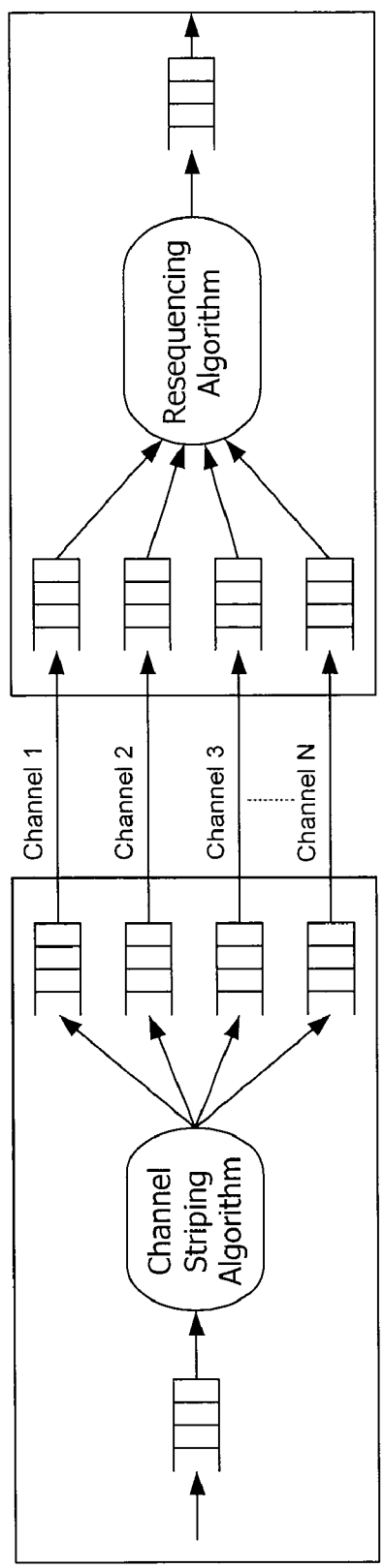
FIG. 1 is a block diagram illustrating a prior art packet striping technique.
Figure 10:
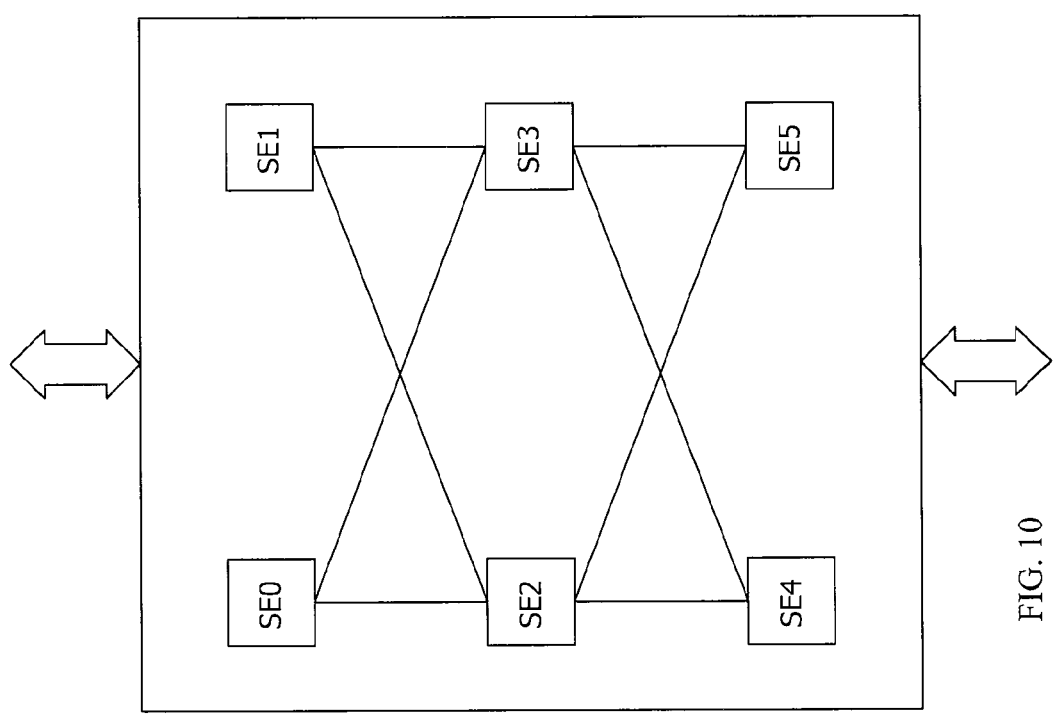
FIG. 10 is a block diagram illustrating an expandable variation of FIG. 3.

To summarize the operation of the invention, a uniform or variable length data packet is stored in an ingress port at a relatively high data rate and is transmitted to its final destination port on one serial link. Moreover, since the packet is not broken into smaller pieces, where the header becomes a significant part of the data packet, overhead is minimized and the highest data rate is maintained. The switching fabric configuration as shown by the switch elements of FIG. 3 allows for redundancy where, in the case of failure one switch element, another is automatically selected. This is not true of ordinary parallel channel devices as illustrated in FIG. 1. Moreover, additional bandwidth and data input can be provided by adding more switch elements; for example, in a butterfly configuration as illustrated in FIG. 10.

In summary, improved switching apparatus for increasing data rates with limited switching speeds has been provided.

It is claimed:

1. An apparatus comprising:
   means for sequentially distributing complete data packets from a plurality of source ports to a plurality of switching elements at a lower data rate wherein some latency occurs between the complete data packets;
   means for sequentially receiving complete data packets from the switching elements to a plurality of destination ports at the lower data rate wherein some latency occurs between the complete data packets; and
   means for routing the complete data packets through a single serial link in response to a data packet event while sustaining throughput from the source ports to the switching elements and the switching elements to the destination ports at a higher data rate;
   wherein both the source ports and destination ports are adapted to operate approximately at the higher data rate.

2. The apparatus of claim 1 wherein
   the number of switching elements is proportional to the ratio of the high to low data rates.

3. The apparatus of claim 1 wherein
   the number of switching elements is upwardly scalable to accommodate greater data input.

4. The apparatus of claim 1 wherein
   the complete data packet transferred on one serial link minimizes overhead by avoiding the break up of each data packet into segments requiring headers.

5. The apparatus of claim 1 wherein
   each data packet event is defined as completing the transfer of one data packet and beginning the transfer of another data packet immediately.

6. An apparatus comprising:
   means for receiving frames at inputs of a plurality of source ports at a higher data rate;
   means for successively distributing complete data packets at a lower data rate on a plurality of source port outputs that form multiple parallel channels to a plurality of switching elements in response to a data packet events;
   means for receiving the complete data packets on a given one of a plurality of switching element inputs that are individually connected to the source port outputs wherein the effective throughput of data is the higher data rate from the source port outputs to the switching element inputs;
   means for transferring the complete data packets on a given one of a plurality of switching element outputs to a given one of a plurality of destination ports;
   means for successively receiving the complete data packets at the lower data rate in response to the data packet event on a given one of a plurality of destination port inputs that form multiple parallel channels wherein the plurality of destination port inputs are individually connected to the switching element outputs and the effective throughput of data is the higher data rate from the switching element outputs to the destination port inputs; and
   means for outputting the complete data packets on a destination port output at the higher data rate;
   wherein complete data packets are routed through a single serial link, the single serial link comprising a given one of the source ports, a given one of the switching elements and a given one of the destination ports.

7. The apparatus of claim 6 wherein
   the number of switching elements is proportional to the ratio of the high to low data rates.

8. The apparatus of claim 6 wherein
   the number of switching elements is upwardly scalable to accommodate greater data input.

9. The apparatus of claim 6 comprising
   means for transferring the complete data packet on one serial link minimizes overhead by avoiding the break up of each data packet into segments requiring headers.

10. The apparatus of claim 6 wherein
    each data packet event is defined as completing the transfer of one data packet and beginning the transfer of another data packet immediately after.

11. A process comprising:
    sequentially distributing complete data packets from a plurality of source ports to a plurality of switching elements at a lower data rate wherein some latency occurs between the complete data packets; and
    sequentially receiving complete data packets from the switching elements to a plurality of destination ports at the lower data rate wherein some latency occurs between the complete data packets
    wherein both the source ports and destination ports are configured to operate approximately at a higher data rate and
    wherein the complete data packets are routed through a single serial link in response to a data packet event while sustaining throughput from the source ports to the switching elements and the switching elements to the destination ports at the higher data rate.

12. The process of claim 11 wherein
    the number of switching elements is proportional to the ratio of the high to low data rates.

13. The process of claim 11 wherein
    the number of switching elements is upwardly scalable to accommodate greater data input.

14. The process of claim 11 wherein
    the complete data packet transferred on one serial link minimizes overhead by avoiding the break up of each data packet into segments requiring headers.

15. The process of claim 11 wherein
    each data packet event is defined as completing the transfer of one data packet and beginning the transfer of another data packet immediately.

16. An apparatus comprising:
    a plurality of source ports for sequentially distributing complete data packets to a plurality of switching elements at a lower data rate wherein some latency occurs between the complete data packets; and a plurality of destination ports for sequentially receiving complete data packets from the plurality of switching elements at the lower data rate wherein some latency occurs between the complete data packets;

wherein both the source ports and destination ports are configured to operate approximately at a higher data rate; and wherein the complete data packets are routed through a single serial link in response to a data packet event while sustaining throughput from the source ports to the switching elements and the switching elements to the destination ports at the higher data rate.

17. The apparatus of claim 16 wherein at least one of the source ports comprises;
   a communications processor operable to process the complete data packets at the higher data rate;
   a traffic manager having an input coupled to the communications processor, the traffic manager further comprising;
   a sequential sprinkler engine operable to successively distribute the complete data packets to the switching elements at the lower data rate; and
   control logic operable to command the sequential sprinkler engine to output the complete data packets successively.

18. The apparatus of claim 16 wherein at least one of the destination ports comprises a traffic manager, the traffic manager further comprising:
   a sequential sprinkler engine operable to successively receive the complete data packets from the switching elements at the lower data rate;
   control logic operable to command the sequential sprinkler engine to successively receive the complete data packets; and
   a communications processor operable to output the complete data packets at the higher data rate and having an input coupled to the traffic manager.

19. An apparatus comprising:
   a plurality of source ports, at least one of the source ports operable to receive complete data packets successively at a higher data rate and to output data via a plurality of source port outputs at a lower data rate;
   a plurality of switching elements that form a sequential switching fabric and operate at the lower data rate, at least one of the switching elements having:
      a plurality of switching element inputs individually connected to each of the source port outputs; and
      a plurality of switching element outputs;
   both the switching elements and the source ports configured to change a given one of the source port outputs successively from a given one of the switching elements to a next available switching element in response to a data packet event;
   a plurality of destination ports, at least one of the destination ports operable to receive the complete data packets successively at the lower data rate and having:
      a plurality of destination port inputs individually connected to each of the switching element outputs; and
      a plurality of destination port outputs operable to output the complete data packets at the higher data rates;
   both the switching elements and the destination ports configured to change a given one of the destination port inputs successively from the given one of the switching elements to the next available switching element in response to the data packet event;

wherein the effective data rate from the source port outputs to the switching element inputs and from the switching element outputs to the destination port inputs is the higher data rate; and wherein the complete data packets of variable or fixed size are transferred through a single serial link, the single serial link comprising a given one of the source ports, a given one of the switching elements and a given one of the destination ports.

20. The apparatus of claim 19 wherein
   the ratio of higher to lower data rates is four to one
   a minimum of four switching elements per source port is supplied.

21. The apparatus of claim 19 wherein
   a minimum of two switching elements per source port is supplied.

22. The apparatus of claim 19 wherein
   the number of switching elements is proportional to the ratio of higher to lower data rates.

23. The apparatus of claim 22 wherein
   the number of switching elements is upwardly scalable to accommodate greater data input.

24. The apparatus of claim 19 wherein
   each data packet event is defined as completing the transfer of one data packet and beginning the transfer of another data packet immediately after.

25. The apparatus of claim 19 wherein
   the complete data packet is routed from at least one of the source ports to a given one of the destination ports where a payload of each data packet is much larger in comparison to an attached header that identifies the data packet and its ultimate destination such that overhead is minimized.

26. The apparatus of claim 19 wherein at least one of the source ports comprises:
   a communications processor coupled to the source port input and operable to process the complete data packets at the higher data rate;
   a traffic manager having an input coupled to the communications processor, the traffic manager further comprising;
   a sequential sprinkler engine operable to successively distribute the complete data packets to the switching elements at the lower data rate; and
   control logic operable to command the sequential sprinkler engine to output the complete data packets successively on the source port outputs.

27. The apparatus of claim 19 wherein at least one of the destination ports comprises
   a traffic manager, the traffic manager further comprising:
   a sequential sprinkler engine operable to successively receive the complete data packets from the switching elements at the lower data rate;
   control logic operable to command the sequential sprinkler engine to successively receive the complete data packets on the destination port inputs; and
   a communications processor operable to output the complete data packets at the higher data rate and having an input coupled to the traffic manager and an output coupled to the destination port output.

28. A process comprising:
   receiving frames at inputs of a plurality of source ports at a higher data rate;
   successively distributing complete data packets at a lower data rate on a plurality of source port outputs that form multiple parallel channels to a plurality of switching elements in response to a data packet event;

receiving the complete data packets on a given one of a plurality of switching element inputs that are individually connected to the source port outputs wherein the effective throughput of data is the higher data rate from the source port outputs to the switching element inputs;

transferring the complete data packets on a given one of a plurality of switching element outputs to a given one of a plurality of destination ports;

successively receiving the complete data packets at the lower data rate in response to the data packet event on a given one of a plurality of destination port inputs that form multiple parallel channels wherein the plurality of destination port inputs are individually connected to the switching element outputs and the effective throughput of data is the higher data rate from the switching element outputs to the destination port inputs; and outputting the complete data packets on a destination port output at the higher data rate;

wherein complete data packets are routed through a single serial link, the single serial link comprising a given one of the source ports, a given one of the switching elements and a given one of the destination ports.

29. The process of claim 28 wherein
the number of switching elements is proportional to the ratio of the high to low data rates.

30. The process of claim 28 wherein
the number of switching elements is upwardly scalable to accommodate greater data input.

31. The process of claim 28 comprising
transferring the complete data packet on one serial link minimizes overhead by avoiding the break up of each data packet into segments requiring headers.

32. The process of claim 28 wherein
each data packet event is defined as completing the transfer of one data packet and beginning the transfer of another data packet immediately after.

33. An apparatus comprising:
a plurality of source ports operable to receive frames at a higher data rate, at least one of the source ports comprising;
  a source port; and
  a plurality of source port outputs providing multiple parallel channels;
  wherein at least one of the source ports is operable to sequentially output complete data packets through the multiple parallel channels at a lower data rate
a plurality of switching elements forming a sequential switching fabric and operating at the lower data rate, the switching elements each comprising
a plurality of switching element inputs individually coupled to the source port outputs;
a plurality of switching element outputs; and
a plurality of destination ports operable to sequentially receive the complete data packets at the lower data rate and output the complete data packets at the higher data rate, at least one of the destination ports comprising:
  a plurality of destination port inputs individually coupled to the switching element outputs; and
  a destination port output;
wherein the complete data packets having uniform or variable size are routed through a single serial link while sustaining throughput at the higher data rate, the single serial link formed by a given one of the source ports, a given one of the switching elements and a given one of the destination ports.

34. The apparatus of claim 33 wherein at least one of the source ports comprises:

a communications processor coupled to the source port input and operable to process the complete data packets at the higher data rate; and a traffic manager having an input coupled to the communications processor, the traffic manager further comprising:
  a sequential sprinkler engine operable to successively distribute the complete data packets to the switching elements at the lower data rate; and
  control logic operable to command the sequential sprinkler engine to output the complete data packets successively on the source port outputs.

35. The apparatus of claim 33 wherein at least one of the destination ports comprises a traffic manager, the traffic manager further comprising:
  a sequential sprinkler engine operable to successively receive the complete data packets from the switching elements at the lower data rate;
  control logic operable to command the sequential sprinkler engine to successively receive the complete data packets on the destination port inputs; and
  a communications processor operable to output the complete data packets at the higher data rate and having an input coupled to the traffic manager and an output coupled to the destination port output.

36. A process comprising:
receiving frames at an input of a plurality of source ports at a higher data rates;
sequentially distributing complete data packets at a lower data rate from a plurality of source port outputs to a plurality of switching elements;
receiving the complete data packets at a lower data rate on a plurality of switching element inputs;
transferring the complete data packets to a plurality of destination ports;
sequentially receiving the complete data packets at a lower data rate on a plurality of destination port inputs; and
outputting the complete data packets from a given one of the destination ports at the higher data rate;
wherein the complete data packets are routed through a single serial link while sustaining throughput at the higher data rate, the single serial link formed by a given one of the source ports, a given one of the switching elements and a given one of the destination ports.

37. The process of claim 36 wherein
the number of switching elements is proportional to the ratio of the high to low data rates.

38. The process of claim 36 wherein
the number of switching elements is upwardly scalable to accommodate greater data input.

39. The process of claim 36 wherein
the complete data packet transferred on one serial link minimizes overhead by avoiding the break up of each data packet into segments requiring headers.

40. The process of claim 36 wherein
each data packet event is defined as completing the transfer of one data packet and beginning the transfer of another data packet immediately.

41. An apparatus comprising:
means for receiving frames at an input of a plurality of source ports at a higher data rate;
means for sequentially distributing complete data packets at a lower data rate from a plurality of source port outputs to a plurality of switching elements;

means for receiving the complete data packets at a lower data rate on a plurality of switching element inputs;

means for transferring the complete data packets to a plurality of destination ports;

means for sequentially receiving the complete data packets at a lower data rate on a plurality of destination port inputs; and means for outputting the complete data packets from a given one of the destination ports at the higher data rate;

wherein the complete data packets are routed through a single serial link while sustaining throughput at the higher data rate, the single serial link formed by a given one of the source ports, a given one of the switching elements and a given one of the destination ports.

42. The apparatus of claim 41 wherein
the number of switching elements is proportional to the ratio of the high to low data rates.

43. The process of claim 41 wherein
the number of switching elements is upwardly scalable to accommodate greater data input.

44. The process of claim 41 wherein
the complete data packet transferred on one serial link minimizes overhead by avoiding the break up of each data packet into segments requiring headers.

45. The process of claim 41 wherein
each data packet event is defined as completing the transfer of one data packet and beginning the transfer of another data packet immediately.

* * * * *